| (12) | United States Patent<br>Tsai et al. | (10) Patent No.: US 8,570,154 B2<br>(45) Date of Patent: Oct. 29, 2013 |
|---|---|---|

(54) METHOD FOR OPERATING A SYSTEM OF READERS

(75) Inventors: Wen-Chieh Tsai, Taoyuan County (TW); Ming-Town Lee, Taoyuan County (TW); Long-Guang Lee, Taoyuan County (TW)

(73) Assignee: Chung-Shan Institute of Science and Technology, Armaments, Bureau, Ministry of National Defense, Taoyuan County (TW)

( * ) Notice: Subject to any disclaimer, the term of this patent is extended or adjusted under 35 U.S.C. 154(b) by 527 days.

(21) Appl. No.: 12/960,471

(22) Filed: Dec. 4, 2010

(65) Prior Publication Data

US 2012/0050014 A1    Mar. 1, 2012

(30) Foreign Application Priority Data

Aug. 26, 2010    (TW) .............................. 99128558 A

(51) Int. Cl.
*H04Q 5/22* (2006.01)
*G08B 13/14* (2006.01)

(52) U.S. Cl.
USPC ........................................ 340/10.1; 340/572.1

(58) Field of Classification Search
None
See application file for complete search history.

(56) References Cited

U.S. PATENT DOCUMENTS

2009/0009295 A1*    1/2009    Rofougaran ................. 340/10.1

* cited by examiner

*Primary Examiner* — Brian Zimmerman
*Assistant Examiner* — Cal Eustaquio
(74) *Attorney, Agent, or Firm* — Jackson IPG PLLC

(57) ABSTRACT

Disclosed is a method for operating a system of first and second readers. In the method, a processor is provided to produce a command. The command is used to get the first reader in an active mode and the second reader in a standby mode. The second reader is wakened up so that the first and second readers are in the active mode at the same time. The first reader is switched to the standby mode while the second reader is retained in the active mode.

10 Claims, 5 Drawing Sheets

METHOD FOR OPERATING A SYSTEM OF READERS

BACKGROUND OF INVENTION

1. Field of Invention

The present invention relates to a method for operating a system of readers and, more particularly, to a method for operating a system of readers with an exchange mechanism.

2. Related Prior Art

Radio frequency identification ("RFID") is used in various fields. RFID is a non-contact automatic identification technique based on transmission of radio for carrying data. With RFID, a large amount of data can be identified in a short period of time. Hence, for automatic control of vehicles, persons and cargo in airports, RFID is often used instead of the barcode identification technique. RFID has accomplished what other identification techniques cannot. Unlike the barcode identification technique, RFID does not require contact of a reader with a tag or alignment of the reader with the target tag. In addition, the tags used in RFID are less vulnerable to contaminants than the tags used in the barcode identification technique. Furthermore, there is more flexibility in locating the tags used in RFID than the barcode identification technique. For example, a tag used in RFID can be sandwiched between two layers of paper of a box.

RFID is based on inductive coupling or propagation coupling. In an RFID system, a tag is attached to an object by adhesion, insertion, hanging or implanting. As the object is located in a proper reading range around a reader, in a non-contact manner, the tag provides the reader with data such as an ID number. The data are decoded in the reader. The decoded data are sent to another apparatus for further processing.

Referring to FIG. 1, a typical RFID system includes a reader 11, a tag 12 and an antenna 13. The reader 11 sends a signal to the tag 12 so that the reader 11 actuates and recharges the tag 12 in an electro-magnetic field. Recharged, the tag 12 transmits data to the reader 11. The read 11 decodes the data and broadcasts the decoded data via the antenna 13. A processor such as a computer receives the decoded data and takes actions according to the decoded data.

RFID systems can be classified into low frequency systems ("LF") operated at 125 KHz, high frequency systems ("HF") operated at about 13.56 MHz, ultra high frequency systems ("UHF") operated at 900 MHz, and microwave systems operated at 2.4 GHz or 5.8 GHz. An RFID system may include a portable or stationary reader. A portable reader is often carried and used by a person in an inventory check. A stationary reader is often attached to a door or gate of a factory. The stationary reader is expected to be more reliable than the portable reader. However, the stationary reader might lose or damage the data because the power of the transmission of the radio drops or the efficiency of the operation of a processor located therein drops after a long period of service.

Currently, to use the RFID system for a long period, the stationary reader is equipped with a trigger. After the RFID system is turned on, the trigger begins to work. The trigger puts the reader in a standby mode if it does not detect any object. The trigger sends a signal to the reader if it detects an object. With the signal, the reader beings to search for, actuate, recharge and receive data from a tag. Then, the reader returns to the standby mode, and waits for another signal from the trigger. There however are problems with this arrangement. At first, the reading efficiency and range might decrease after a long period of service. Secondly, the abnormal operation of the reader might last too long to keep the data in the reader.

The present invention is therefore intended to obviate or at least alleviate the problems encountered in prior art.

SUMMARY OF INVENTION

It is the primary objective of the present invention to provide a method for operating a system of readers with an exchange mechanism.

To achieve the foregoing objective, the method includes the steps of providing a processor to produce a command, using the command to get the first reader in an active mode and the second reader in a standby mode, waking up the second reader so that the first and second readers are in the active mode at the same time, and switching the first reader to the standby mode and retaining the second reader in the active mode.

Other objectives, advantages and features of the present invention will be apparent from the following description referring to the attached drawings.

BRIEF DESCRIPTION OF DRAWINGS

The present invention will be described via detailed illustration of the preferred embodiment in view of the prior art referring to the drawings wherein.

DETAILED DESCRIPTION OF PREFERRED EMBODIMENT

Figure 1:
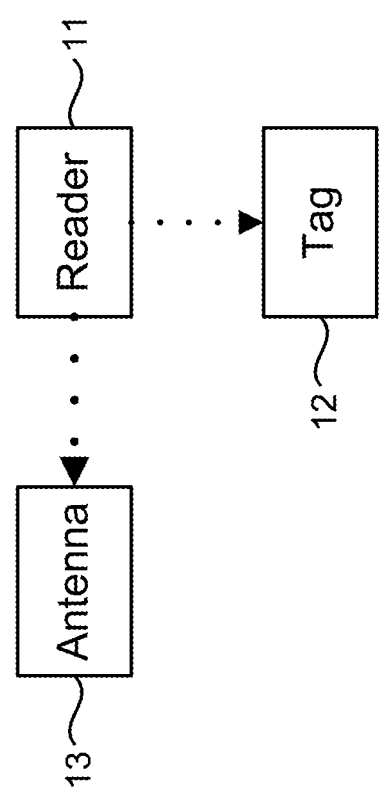
FIG. 1 is a block diagram of a conventional RFID system.
Figure 2:
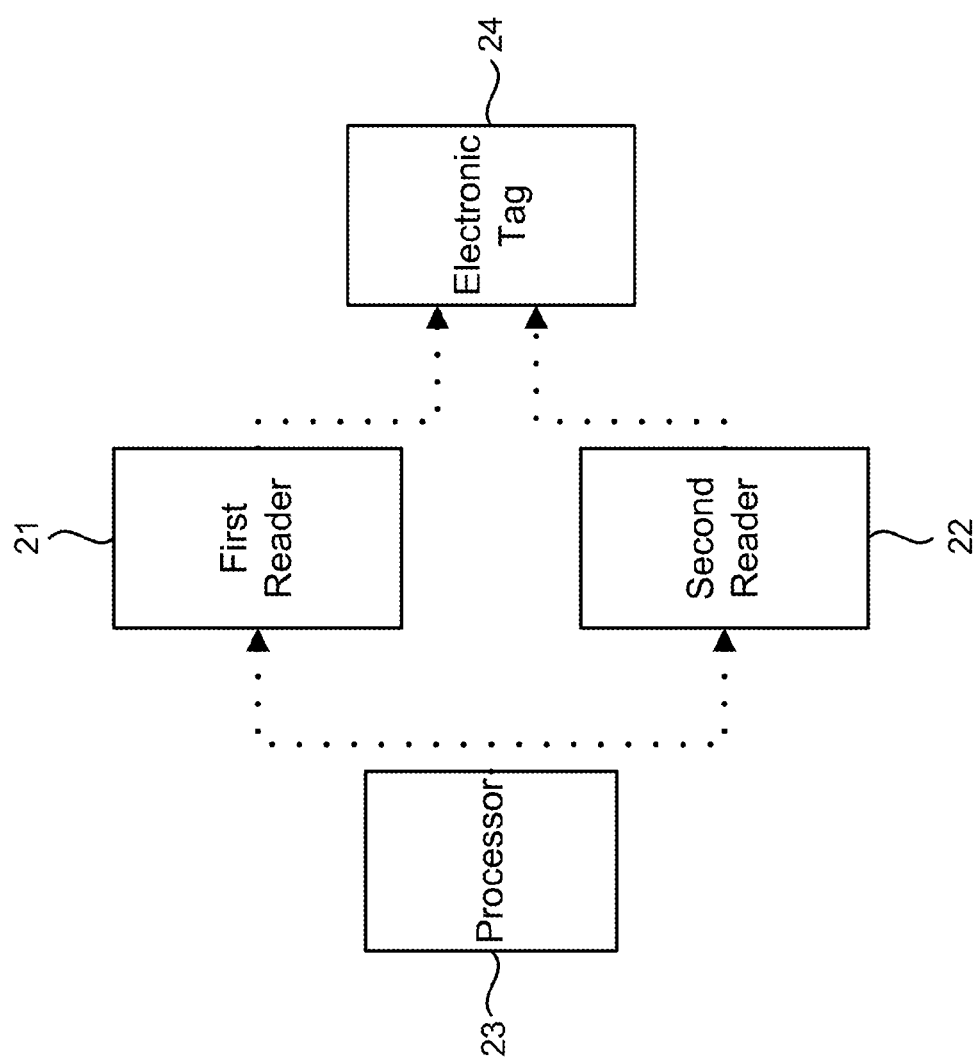
FIG. 2 is a block diagram of an RFID system according to the preferred embodiment of the present invention.

Referring to FIG. 2, an RFID system includes a first reader 21, a second reader 22, a processor 23 and an electronic tag 24 according to the preferred embodiment of the present invention. There is also radio communication between the first reader 21 and the electronic tag 24. There is radio communication between the electronic tag 24 and each of the reader 22 and 24. The electronic tag 24 can be made as a card, token or any other proper configuration.

Figure 3:
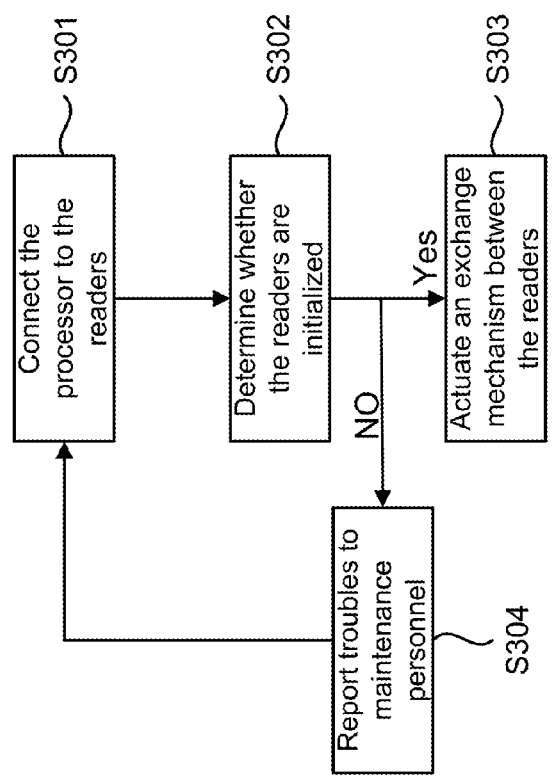
FIG. 3 is a flow chart of a method for operating the RFID system shown in FIG. 2.

Referring to FIG. 3, there is shown a method for operating the RFID system shown in FIG. 2. At S301, the processor 23 is connected to each of the readers 21 and 22. The communication of the processor 23 with each of the readers 21 and 22 can be done via a UDP web so that each of the readers 21 and 22 actively accesses to the processor 23, which plays a passive role. Alternatively, the communication of the processor 23 with each of the readers 21 and 22 can be conducted via TCP/IP so that the processors 23 actively access to each of the readers 21 and 22 at a certain IP address.

At S302, the processor 23 determines whether each of the readers 21 and 22 is initialized. The process goes to S303 if the readers 21 and 22 are initialized and ready to execute commands from the processor 23. Otherwise, the process goes to S304.

At S303, the processor 23 actuates an exchange mechanism between the readers 21 and 22.

At S304, the processor 23 reports troubles to maintenance personnel. After trouble shooting, the processor 23 returns to S301.

Figure 4:
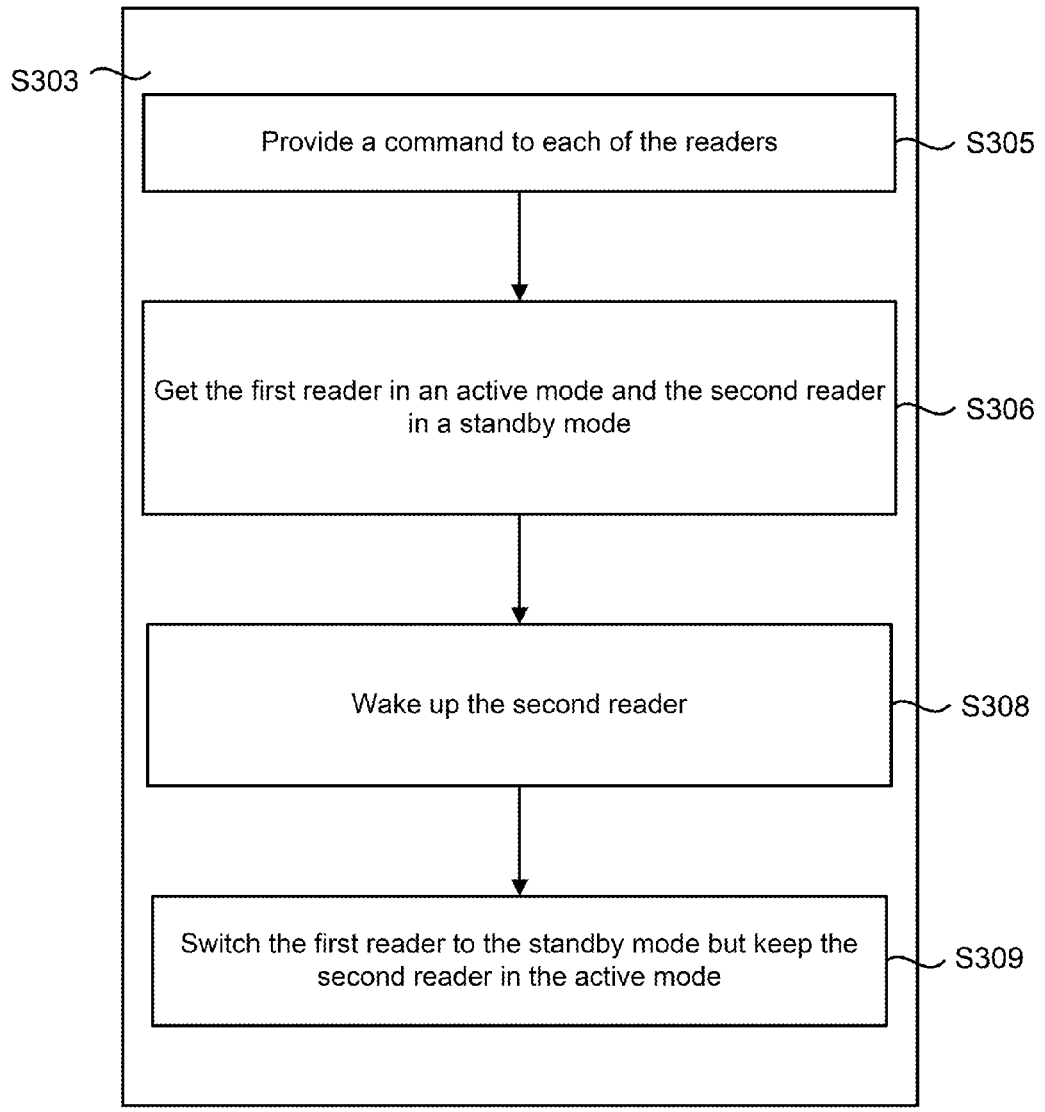
FIG. 4 is a more detailed flow chart of the method shown in FIG. 3.

Referring to FIG. 4, the exchange mechanism is shown. At S305, the processor 23 provides a command 41 to each of the readers 21 and 22.

At S306, the command 41 gets the first reader 21 in an active mode and the second reader 22 in a standby mode.

At S308, the processor 23 wakes up the second reader 22 so that both of the readers 21 and 22 are in the active mode at the same time.

At S309, the command 41 switches the first reader 21 to the standby mode but keeps the second reader 22 in the active mode.

Figure 5:
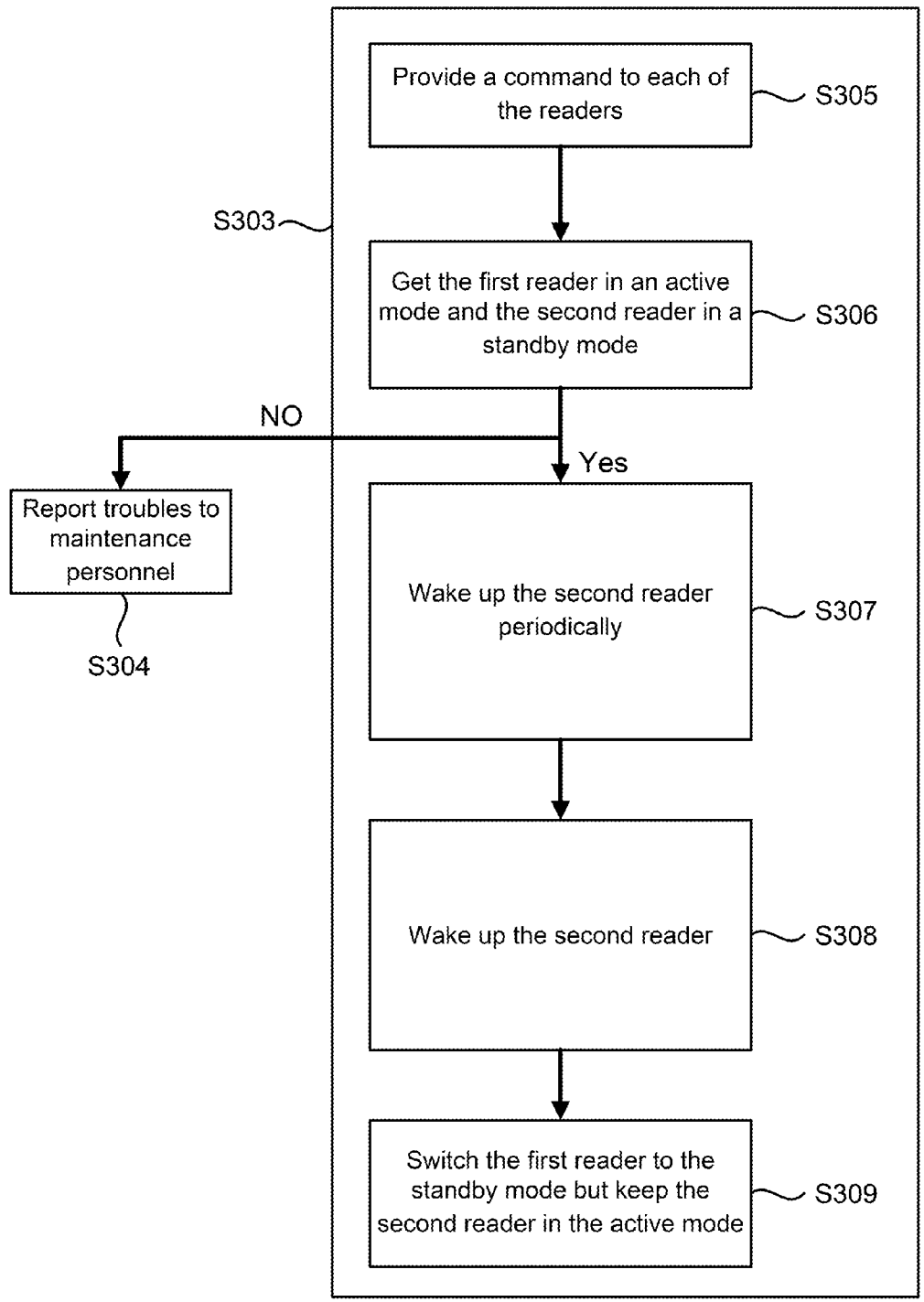
FIG. 5 is a more detailed flow chart of the method shown in FIG. 4.

Referring to FIG. 5, more details of the method shown in FIG. 4 are given. At S305, the processor 23 provides a command 41 to each of the readers 21 and 22.

At S306, the command 41 gets the first reader 21 in an active mode and the second reader 22 in a standby mode. The processor 23 determines whether the first reader 21 is successfully located in the active mode and the second reader 22 is successfully located in the standby mode. The process goes to S307 if the first reader 21 is in the active mode and the second reader 22 is in the standby mode. The process goes to S304 the first reader 21 is not in the active mode and/or the second reader 22 is not in the standby mode.

At S307, the second reader 22 wakes up from the standby mode for every 30 or 60 minutes for example. Temporarily in the active mode, the second reader 22 connects to the proc processor 23. After successfully connecting to the processor 23, the second reader 22 soon returns to the standby mode.

The communication of the processor 23 with each of the readers 21 and 22 can be done via a UDP web so that each of the readers 21 and 22 actively accesses to the processor 23, which plays a passive role. Alternatively, the communication of the processor 23 with each of the readers 21 and 22 can be conducted via TCP/IP so that the processors 23 actively access to each of the readers 21 and 22 at a certain IP address.

At S308, the processor 23 wakes up the second reader 22 so that both of the readers 21 and 22 are in the active mode at the same time. The readers 21 and 22 exchange data when both of them are in the active mode. Hence, there are two identical copies of the data, one in the first reader 21 and the other in the second reader 22. The risks of the data lost are reduced.

At S309, the command 41 switches the first reader 21 to the standby mode but keeps the second reader 22 in the active mode.

According to the method of the present invention, degrading of the efficiency and range of the reading after a long period of service or operation in a hot environment is avoided. According to the method of the present invention, the readers 21 and 22 take turns to work. Hence, each of the readers 21 and 22 is put to rest from time to time, and its life is extended. Moreover, the processor 23 actively reports troubles to the maintenance personnel for instant trouble shooting. Hence, the risks of losing the data due to failure of the readers 21 and 22 for a long time are reduced.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for operating a system of multiple readers, the method including the steps of:
    placing a first reader in an active mode and a second reader in a standby mode;
    waking up the second reader so that the first and second readers are in the active mode at the same time and in communication with each other;
    exchanging data between the first and second readers such that two identical copies of the data exist on each of the first and second readers; and
    switching the first reader to the standby mode and retaining the second reader in the active mode.

2. The method according to claim 1, wherein the step of placing the first reader in the active mode and the second reader in the standby mode further includes periodically switching the second reader to the active mode so that the second reader requests a processor for communication.

3. The method according to claim 1, wherein the step of placing the first reader in the active mode and the second reader in the standby mode further includes periodically switching the second reader to the active mode so that a processor can request the second reader for communication.

4. The method according to claim 1, wherein the step of switching the first reader to the standby mode and retaining the second reader in the active mode further includes periodically switching the first reader to the active mode so that the first reader requests a processor for communication.

5. The method according to claim 1, wherein the step of switching the first reader to the standby mode and retaining the second reader in the active mode further includes periodically switching the first reader to the active mode so that a processor can request the first reader for communication.

6. The method according to claim 1, wherein the first and second readers operate at 13.56 MHz.

7. The method according to claim 1, wherein the first and second readers operate at 900 MHz.

8. The method according to claim 1, wherein the first and second readers read data from a tag in a non-contact manner.

9. A multiple reader system including:
    a first reader configured to read electronic tags;
    a second reader configured to read the electronic tags; and
    a processor for controlling the first and second readers, wherein the processor places the first reader in an active mode and the second reader in a standby mode, then wakes up the second reader so that the first and second readers are in the active mode at the same time and in communication with each other so as to exchange data between each other such that two identical copies of the data exist on each of the first and second readers, and then switches the first reader to the standby mode and retains the second reader in the active mode.

10. The method according to claim 9, wherein the first and second readers read data from the tags in a non-contact manner.

* * * * *